J. L. MacCARTHY.
SIGNAL LIGHT AND REAR LIGHT FOR VEHICLES.
APPLICATION FILED DEC. 23, 1916.
1,292,400.
Patented Jan. 21, 1919.
2 SHEETS—SHEET 1.
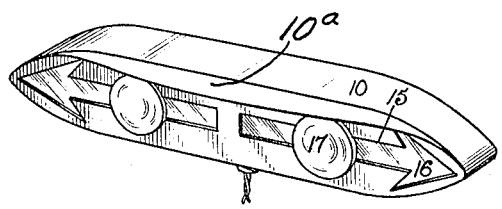
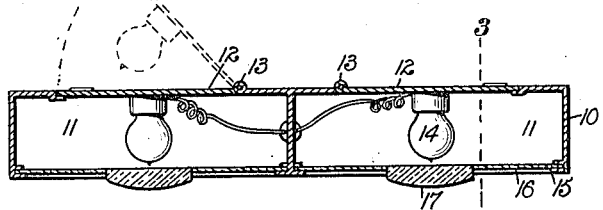
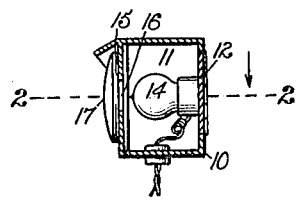
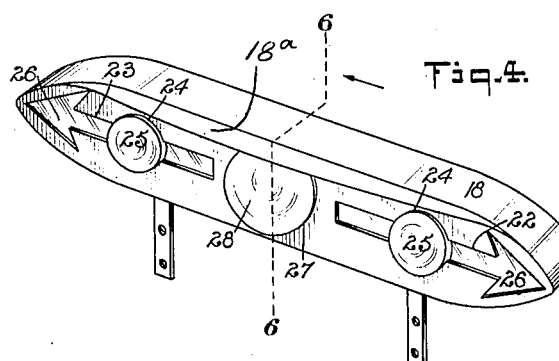
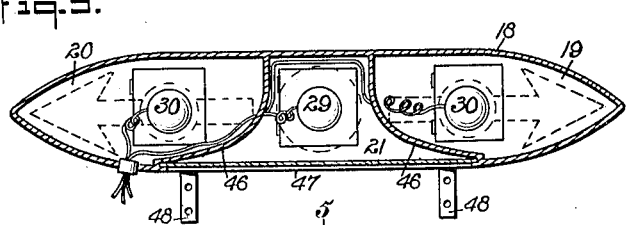
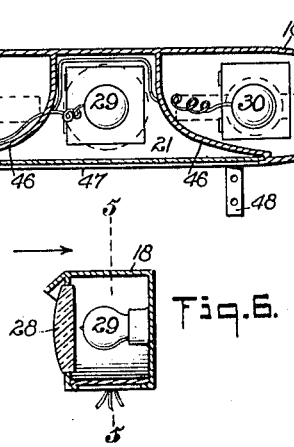
WITNESSES
INVENTOR
J. L. MacCarthy
BY
ATTORNEYS

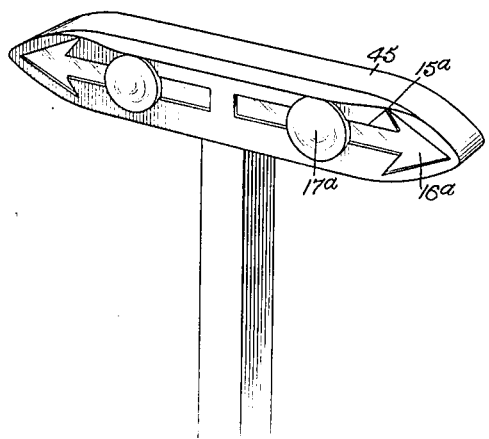
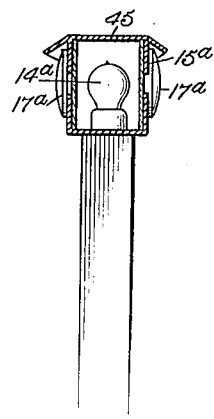
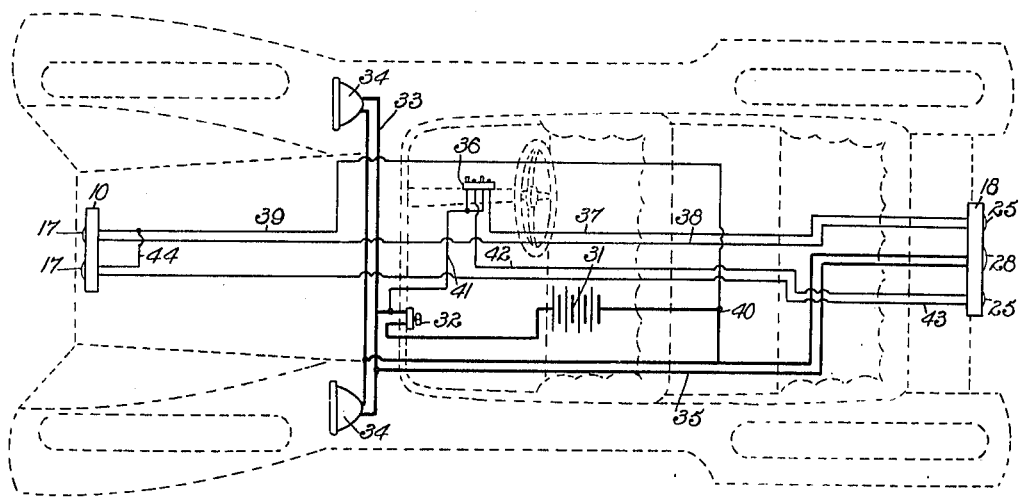

UNITED STATES PATENT OFFICE.

JAMES L. MacCARTHY, OF BROOKLYN, NEW YORK.

SIGNAL-LIGHT AND REAR LIGHT FOR VEHICLES.

1,292,400.     Specification of Letters Patent.     Patented Jan. 21, 1919.

Application filed December 23, 1916. Serial No. 138,553.

*To all whom it may concern:*

Be it known that I, JAMES L. MACCARTHY, a citizen of the United States, and a resident of the city of New York, borough of Brooklyn, in the county of Kings and State of New York, have invented a new and Improved Signal-Light and Rear Light for Vehicles, of which the following is a full, clear, and exact description.

My invention has for its object to provide a signal light and rear light for vehicles, which has a casing with two compartments, in each of which is disposed a lamp which when lighted will illuminate an arrow for indicating the direction in which the vehicle is about to travel, there being a red bull's-eye lens disposed at each arrow, the contrast of which with the illuminated arrow will attract attention. There are preferably two of these casings, one disposed at the front and the other at the rear of the vehicle, the casing at the rear of the vehicle having a third compartment in which there is a rear light which remains lighted at night when the vehicle is in use whether the arrows and bull's-eyes are illuminated, the casing at the rear having an opening through which the light rays from the third compartment may pass to a number plate supported by the casing.

Another object of the invention is to provide means on the steering post of an automobile to light the right front and rear lens, or the left front and rear lens simultaneously.

Still other objects of the invention will appear in the following specification in which the preferred form of my invention is described.

Reference is to be had to the accompanying drawings forming a part of this specification in which similar characters of reference refer to similar parts in all the views, in which—

Figure 1 is a perspective view showing the casing at the front of the vehicle;

Fig. 2 is a sectional view on the line 2—2 of Fig. 3;

Fig. 3 is a sectional view on the line 3—3 of Fig. 2;

Fig. 4 is a perspective view showing the casing which is to be disposed at the rear of the vehicle;

Fig. 5 is a longitudinal sectional view on the line 5—5 of Fig. 6;

Fig. 6 is a sectional view on the line 6—6 of Fig. 4;

Fig. 7 is a perspective view showing a modified form of the invention;

Fig. 8 is a transverse sectional view of Fig. 7; and

Fig. 9 is a diagrammatic view for illustrating the circuit for lighting the lamps disposed in the compartments of the casings.

By reference to the drawings, it will be seen that the casing 10, which is adapted to be disposed at the front of the vehicle has a rearwardly extending shield 10ª along one edge and is provided with two compartments 11, there being a door 12 hinged at 13 to the casing at the rear of each compartment 11, a lamp 14 for illuminating the compartment being secured to each of the said doors 12. The front of the casing 10 has a cut-out portion 15 in the shape of an arrow, and in this portion 15 there is disposed a glass pane 16, the cut-out portion 15 at the shank of the arrow being enlarged for receiving a colored bull's-eye lens 17, the color of which is preferably red. The arrow-shaped openings 15 point outwardly so that the arrow at the right of the casing 10 will point to the right and the arrow at the left of the casing 10 will point to the left.

In a similar manner a casing 18 is mounted at the rear of the vehicle and provided with a rearwardly extending shield 18ª, this casing 18 having a right-end compartment 19 and a left end compartment 20, the end compartments 19 and 20 being separated by a central compartment 21. The rear of the casing at the right end compartment 19 is cut to form an arrow-shaped opening 22 and the rear of the casing at the compartment 20 is cut away to form an arrow-shaped opening 23, pointing in an opposite direction. Each of these openings 22 and 23 is enlarged at 24 for receiving a colored bull's-eye lens 25, the remainder of the openings 22 and 23 being inclosed by plain glass 26. The rear of the casing 18 at the central compartment 21 is cut away at 27 and in this opening there is disposed a bull's-eye lens 28. A lamp 29 is disposed in the central compartment 21 and there are two lamps 30, one disposed in each of the end compartments 19 and 20. The lamp 29 remains lighted at all times when the vehicle is in use and this lamp 29 illuminates the bull's- eye lens 28 which is the rear light, the lamps 30 illuminating the bull's-eye lenses 25 and the glass 26 covering the arrow-shaped openings 22 and 23, the function of which is to indicate the direction in which the vehicle is about to travel.

The circuits connected with the lamps are indicated in Fig. 9 of the drawings, there being a battery 31, a switch 32 and the usual circuit 33 for illuminating the side lights 34, the usual circuit 35 connected with the lamp 29 for illuminating the bull's-eye lens 28 which serves as the rear light. There are additional circuits lighting the lamps 14 and 30 which are controlled by a switch 36 on the steering post of an automobile, one of these circuits leading from the switch 36 at 37 to the rear right lamp 30, then at the wire 38 to the right front lamp 14, then along the wire 39 to the circuit 35 at 40, through the battery 31, through the switch 32, and then along the wire 41 to the switch 36. With this circuit it will be understood that the right front lamp 14 and the right rear lamp 30 may be lighted simultaneously to indicate not only at the rear but also at the front of the automobile or vehicles the direction, by means of the arrow, in which the vehicle or automobile is to be driven. There is another circuit leading from the switch 36 at the wire 42 to the left rear lamp 30, at the wire 43 to the left front lamp 14, at the wire 44 to wires 39 to 40, and then by means of the circuit 35, the battery 31, the switch 32 and the wire 41 back to the switch 36.

The modified form of the invention illustrated in Figs. 7 and 8 is adapted to be used at a railroad crossing, the casing 45 being substantially the same as the casing 10 with the exception that there are arrow-shaped cutaway portions 15ª at opposite sides of the casing, and the lamp 14ª is mounted on the bottom of the casing 45. With this construction, the lamps 14ª will illuminate the arrow-shaped glasses 16ª and the bull's-eye lenses 17ª at opposite sides of the casing to warn all persons of the approach of trains and the direction in which the trains are running. If there is one train running one way only one lamp 14ª will be lighted, and this lamp 14ª in one end of the compartment will illuminate the arrow-shaped panes of glass 16ª which will point in the direction in which the train is traveling. Should there be trains running in both directions both of the lamps 14ª will be lighted to indicate that trains are traveling in both directions. The lamps 14ª may be lighted at the tracks by automatic means for closing circuits.

The compartments 19 and 20 in the casing 18 are separated from the central compartment 21 by a partition 46, the said partition 46 diverging downwardly so that light rays from the lamp 29 will pass through a glass 47 at the bottom of the casing 18 to illuminate a number plate which may be supported by brackets 48.

Having thus described my invention, I claim as new and desire to secure by Letters Patent:—

1. In a signal light and rear light for vehicles, a casing having two compartments separated by a partition, there being an arrow-shaped translucent portion of the casing at each compartment, two colored bull's-eye lenses in the casing, one at each arrow, and a lamp in each compartment coöperating with the respective lens and arrow to signal plainly both day and night.

2. In a signal light and rear light for vehicles, a casing having a shield extending rearwardly from its edge and provided with two compartments separated by a partition, there being an arrow-shaped translucent portion of the casing at each compartment, two colored bull's-eye lenses in the casing one at each arrow, and a lamp in each compartment coöperating with the respective lens and arrow to signal plainly both day and night.

3. In a signal light and rear light for vehicles, a casing having two compartments separated by a partition, there being an arrow-shaped translucent portion of the casing at each compartment, two colored bull's-eye lenses in the casing one dividing the shank of each of the arrows, and a lamp in each compartment coöperating with the respective lens and arrow to signal plainly both day and night.

JAMES L. MacCARTHY.